Aug. 6, 1929.  M. J. HUGGINS  1,723,172
LIQUID MEASURING DEVICE
Filed May 26, 1922
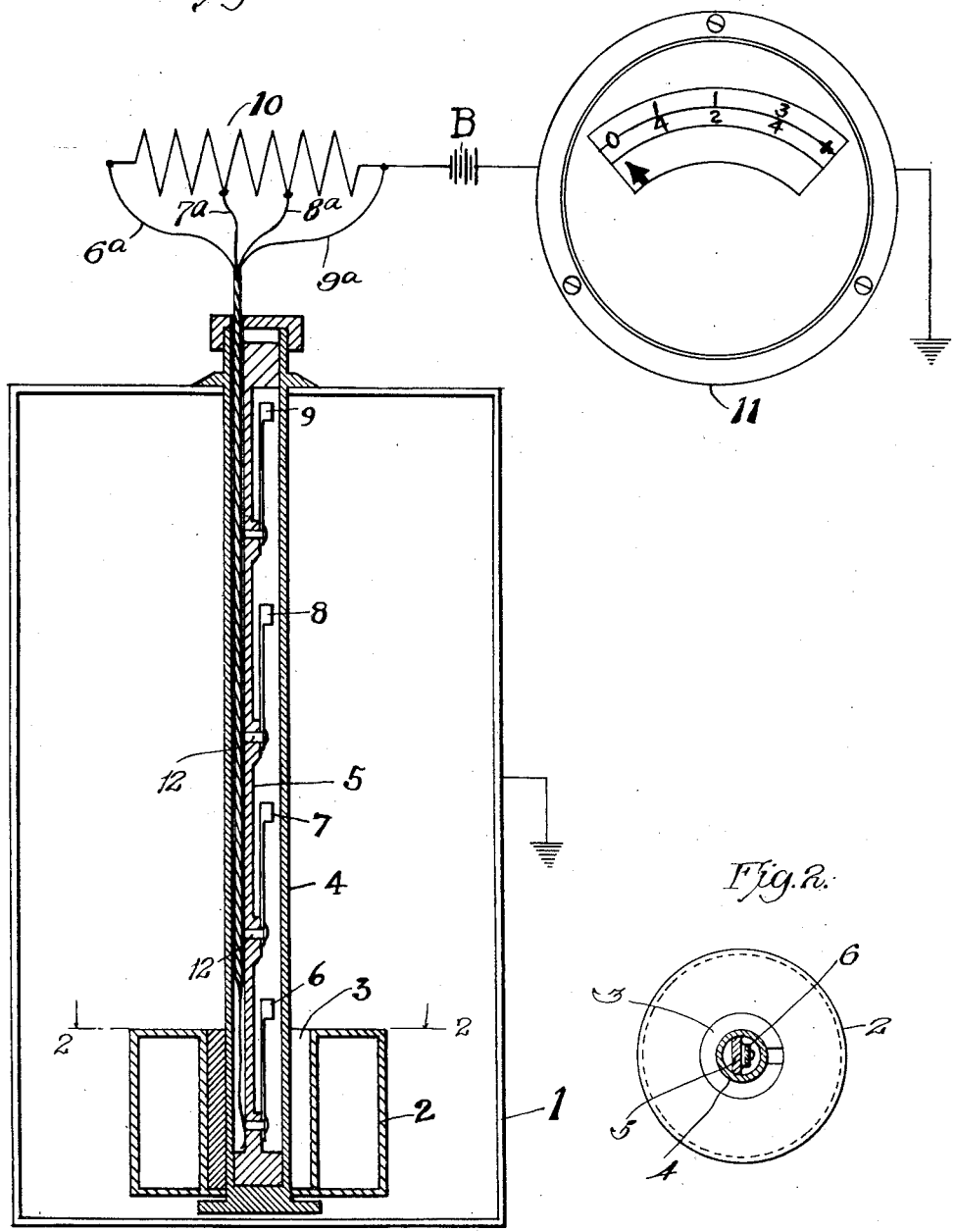
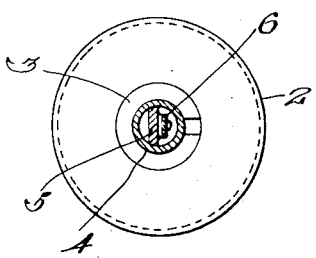
Inventor
Merion J. Huggins Patented Aug. 6, 1929.

1,723,172

UNITED STATES PATENT OFFICE.

MERION J. HUGGINS, OF UPPER SADDLE RIVER, NEW JERSEY, ASSIGNOR TO AUTO METER COMPANY, INC., OF NEW YORK, N. Y., A CORPORATION OF DELAWARE.

LIQUID-MEASURING DEVICE.

Application filed May 26, 1922. Serial No. 563,946.

This invention relates to means for measuring and electrically indicating the quantity of liquid in a tank, and particularly adapted for use in connection with motor vehicles for measuring and indicating the quantity of gasolene in the gasolene storage tank carried by the vehicle.

In means for this purpose there is provided an electric indicating instrument and an electric current flow regulating device embodying a variable resistance element connected in circuit with the instrument and controlled by the varying quantity of liquid in the tank to connect in or cut out variable amounts of the resistance with the instrument, and it is the object of the present invention to provide an improved constructed and arranged electric current flow regulating device adapted to be controlled by the rise and fall or variations in the level of the liquid in the tank, and to provide a device of this character which is simple and cheap in structure, safe and efficient in operation.

Other objects and advantages will hereinafter appear.

In the drawing accompanying and forming a part of this specification there is illustrated a current flow regulating device embodying the invention wherein Figure 1 is a longitudinal sectional view showing the device mounted in a tank and showing in a diagrammatic manner the electrical hook up thereof with an electric indicating instrument; and Figure 2 is a cross sectional view taken substantially on the line 2—2 of Figure 1 looking in the direction of the arrows.

In the embodiment illustrated the device is mounted in a tank 1 containing the liquid to be measured, and which tank may be the gasolene storage tank of a motor vehicle usually arranged at the rear of the vehicle. The device comprises a tube 4 of electric conducting but non-magnetizable material, such as brass, arranged to be mounted in and to be suspended from an opening in the top of the tank to extend to the bottom thereof with the lower end closed as shown.

A series of contacts, in the present instance for illustrative purposes there being four in number, 6, 7, 8 and 9, are mounted in and insulated from the tube and extend in predetermined spaced relation longitudinally of the tube, and to which contacts the tube serves as a common contact. The contacts are in the form of resilient fingers of magnetizable material secured at one end, as by rivets 12, at one side and extending longitudinally of a dielectric carrier in the form of a bar 5 having enlargements at opposite ends whereby it is mounted in the tube. The inherent tension of the material of said contact fingers normally position the same out of contact with the tube 4 and they are flexed to swing or move them into contact with the tube by the attractive force of a magnet 3 of circular form mounted on the tube for longitudinal movement along the same. The magnet is mounted in the core of and carried by a float 2, shown of the hollow type, the float rising and falling through the buoyancy of the liquid with the rise and fall of the liquid level in the tank and thereby positioning the magnet relative to the respective contacts.

The contacts 6 to 9 are electrically connected to different portions of a variable resistance element connected in circuit with an electric indicating instrument 11 and the tube with a source of electricity. This resistance element is in the form of a coil 10 located at a convenient point, shown in the present instance as arranged exterior of the tube 4, and the contacts 6 to 9 electrically connected thereto by conductors $6^a$, $7^a$, $8^a$ and $9^a$ connected to the contacts as by spot soldering to the securing rivets of the contacts and extending through an opening in a closure cap for the outer end of the tube for connection to different sections or portions of the coil.

The coil 10 and the tube 4 are connected with an electric indicating instrument 11 actuated by and responsive to variations in the strength of an electric circuit, said instrument being connected in a closed or open circuit with a source of electric energy, in motor vehicle practice comprising a storage battery conventionally shown at B having one terminal grounded through the instrument in the vehicle frame and the tube 4 being connected therewith by also grounding through the tank as shown in a conventional manner.

In the operation of the device should all or practically all of the liquid be withdrawn from the tank the float will assume the position shown in the drawing and in position where the influence of the magnet upon the lowermost contact is not sufficient to flex said contact and swing or move the same into contact with the tube with the result that the circuit will be open and the indicator or pointer of the instrument assume a position to register with the zero index. Should liquid be supplied to the tank to fill the same to substantially one-quarter of its capacity the float will correspondingly rise with the liquid level in the tank and position the magnet to attract the lowermost contact 6 thereto establishing the circuit but with all of the resistance connected into the circuit of the instrument and influence the instrument to position the indicator in register with the index "¼" and thereby indicating that the tank is filled to one quarter of its capacity. Should the tank be filled to one-half or three-quarters of its capacity the float will be positioned with the magnet opposite to the contacts 7 or 8 and attract said contacts to the tube 4 establishing the circuit and influencing the instrument to move the pointer to register with either the "½" or "¾" indices, and should the tank be filled to its capacity the float will rise to position the magnet to attract the contact 9 to the tube cutting out all of the resistance 10 and influencing the instrument to move the pointer to its extreme right hand position and thereby indicating that the tank is filled to its capacity.

While I have illustrated and described one embodiment of the invention it will be obvious that various modifications and changes may be made in construction and arrangement of parts, and that portions of the invention may be used without others without departing from the scope of the invention.

Having thus described my invention, what I claim is:

1. In liquid level indicating means, a current source, an electric indicator connected in circuit therewith operative by variations in the strength of the current flow, a resistance interposed in the circuit of the instrument, and means for connecting different amounts of the resistance in the circuit to control the actuation of the indicator including a tube of conducting material arranged for mounting in an opening in the top of a tank containing the liquid to be measured to extend from the top to the bottom of the tank interposed in the circuit of the indicator, a dielectric member mounted and enclosed in said tube, a series of contacts of magnetizable material mounted on said member electrically connected to different portions of the resistance element and to all of which contacts the tube is a common contact, said contacts being normally out of contact with the tube, and magnetic means mounted on the tube to rise and fall with the liquid level in the tank operative to move said contacts into contact with the tube through the attractive force of the magnetic means.

2. Liquid level indicating means as claimed in claim 1, wherein the dielectric member extends longitudinally of the tube and the contacts are spaced lengthwise on said tube, and the magnetic means comprises a magnet carried by a float slidably mounted on the tube to have movement along the same through the rise and fall of the liquid level in the tank.

3. In means to measure the quantity of liquid in a tank, electric current flow regulating means including a series of contacts of magnetizable material connected to different portions of an electric resistance element and connect different amounts of said resistance into an electric circuit, and a tubular member of conducting and non-magnetizable material in which said contacts are arranged in longitudinal spaced relation and insulated from each other and the tube, said tube being connected in the circuit of the contacts and resistance element and adapted to serve as a contact common to all of said contacts to close the circuit through either of the contacts with said tube, a magnet, and a carrier for said magnet movable along the tube to position the magnet opposite either of the contacts and move the contacts into contact with the tube through the attraction of the magnet and thereby close the circuit and connect different amounts of the resistance element in the circuit.

4. In means to measure the quantity of liquid in a tank, electric current flow regulating means including a member of dielectric material, a series of movable contacts of magnetizable material mounted and spaced longitudinally on said member, a tubular housing of conducting and non-magnetizable material in which the dielectric member with the contacts thereon is mounted, said contacts being normally assuming to a position out of contact with the housing, conductors leading from the respective contacts to connect the same to different portions of an electric resistance element, said contacts, contact enclosing housing and resistance element being connected in a normally open circuit, a magnet, and a float member carrying said magnet slidably mounted on the tubular housing to position the magnet relative to either of the series of contacts to move the same to the tubular housing by the attractive force of the magnet to establish the electric circuit.

5. Means to measure the quantity of liquid in a tank as claimed in claim 4, wherein each of the series of contacts comprises a finger of resilient material fixed at one end to the di-electric member to extend longitudinally thereof and through the inherent tension thereof normally assuming a position out of contact with the tubular housing and adapted to be flexed through the attractive force of the magnet and move the same in contact with the tubular housing.

6. Means to measure the quantity of liquid in a tank as claimed in claim 4, wherein the magnet is of circular form and the float has an axial core for mounting on the housing and in which core the magnet is mounted and arranged to encircle the tubular housing.

7. In means to measure the quantity of liquid in a tank, a tube of electric conducting and non-magnetizable material, with means for mounting and suspending said tube in an opening in a tank containing the liquid to be measured to extend from the top to the bottom of the tank, a series of contacts of magnetizable material mounted in and insulated from each other and the tube, said contacts being spaced in predetermined relation longitudinally of and normally out of contact with the tube, a resistance element to different portions of which the contacts are electrically connected, a magnet through the attractive force of which the contacts are moved into contact with the tube, and a float slidably mounted on the tube and in which the magnet is mounted with the poles in contiguous relation to the tube.

8. Means to measure the quantity of liquid in a tank as claimed in claim 7, wherein the resistance element is arranged exterior of the tube and the contacts are connected to different sections of said element by conductors connected to the contacts and leading from the tube to the resistance elements.

9. In a liquid level indicator, the combination with an indicator responsive to current strength, of a current source, a resistance, a normally open circuit in which such elements are interposed and means for closing said circuit through different portions of the resistance and thereby controlling the effect of the resistance on the indicator, said means including a float, a permanent magnet carried by the float, a fixed contact in the circuit and a plurality of movable contacts attached at one end and each having its attached end connected with the resistance at a different point, said contacts being of magnetic material and arranged in the path of movement of the magnet whereby they are adapted to be swung into engagement with the fixed contact by the magnet.

Signed at Upper Saddle River, in the county of Bergen and State of New Jersey, this 15th day of May, A. D. 1922.

MERION J. HUGGINS.